(12) United States Patent
Di Benedetto

(10) Patent No.: US 6,382,929 B1
(45) Date of Patent: May 7, 2002

(54) VALVE COMBINATION FOR VIBRATION PUMPS

(75) Inventor: Calogero Di Benedetto, San Martino Siccomario (IT)

(73) Assignee: ULKA SRL, Pavia (IT)

( * ) Notice: Subject to any disclaimer, the term of this patent is extended or adjusted under 35 U.S.C. 154(b) by 0 days.

(21) Appl. No.: 09/485,652

(22) PCT Filed: Jun. 2, 1999

(86) PCT No.: PCT/EP99/03847

§ 371 Date: May 8, 2000

§ 102(e) Date: May 8, 2000

(87) PCT Pub. No.: WO99/66269

PCT Pub. Date: Dec. 23, 1999

(30) Foreign Application Priority Data

Jun. 17, 1998 (IT) .......................... MI980419 U

(51) Int. Cl.⁷ .............................. F04B 49/00; F16T 1/20

(52) U.S. Cl. .................... 417/307; 417/308; 137/198

(58) Field of Search ................ 417/307, 308, 417/440; 137/198, 199, 115.8; 122/4 A, 414, 415

(56) References Cited

U.S. PATENT DOCUMENTS

| | | | | |
|---|---|---|---|---|
| 3,878,680 A | * | 4/1975 | Dauvergne | 60/511 |
| 4,019,680 A | * | 4/1977 | Norris | 237/79 R |
| 5,275,539 A | * | 1/1994 | Custer, Jr. et al. | 417/401 |
| 5,588,809 A | * | 12/1996 | Klein et al. | 417/283 |
| 5,611,673 A | * | 3/1997 | Agata | 417/198 |

FOREIGN PATENT DOCUMENTS

| | | |
|---|---|---|
| DE | 2 054 052 | 5/1972 |
| DE | 93 08 505.2 U1 | 9/1993 |
| IT | 0215741 | * 11/1990 |

* cited by examiner

Primary Examiner—Charles G. Freay
Assistant Examiner—Michael K. Gray
(74) Attorney, Agent, or Firm—Anderson Kill & Olick; Eugene Lieberstein; Michael Meller

(57) ABSTRACT

A valve combination for vibration pumps performs multiple functions of self-priming, compensation of negative pressure and protection against over pressure. A body (12) contains a non-return valve (18). A valve (26) releases air and compensates for negative pressure. A safety valve (48) vents accidental over pressure originating, for example, from a boiler source. The valve (26) in order to achieve negative pressure compensation, comprises a plug provided with grooves or incisions (40a–c) for favoring the external flow of air subject to negative pressure.

13 Claims, 3 Drawing Sheets

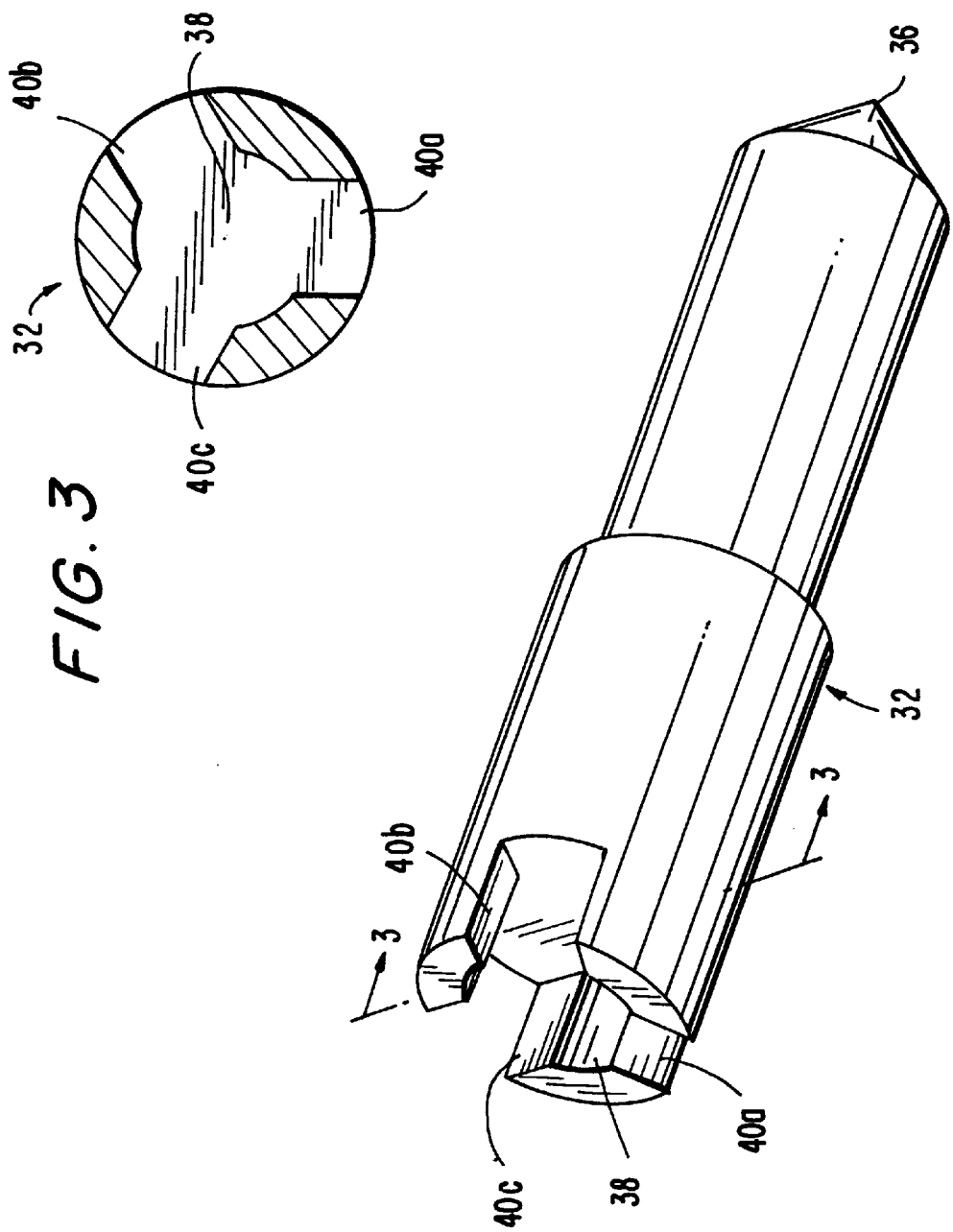

VALVE COMBINATION FOR VIBRATION PUMPS

The present invention relates to a valve, able to perform multiple functions and applicable to systems which are subject to intense variations in pressure such as boilers which are exposed to frequent stoppages with cooling, and constitutes an improvement to the device for self-priming, under backpressure conditions, vibration pumps, which is covered by Industrial Utility Model No. 0,215,741 filed on Mar. 3, 1989 in the name of the Applicants of the present application.

The above mentioned device has proved to be very effective for re-priming vibration pumps under overpressure conditions, but has been unable to successfully resolve a new problem which has arisen when vibrations pumps are used for supplying large-size boilers, such as those of multiple steam generators for stream-cleaners and for irons. In fact, what happens is that when these boilers, after a working cycle, are allowed to cool, the pressure in the closed space present above the water level, which is intended for storage of the steam, passes from a value substantially higher (by a few bars) than atmospheric pressure to a value which is lower than atmospheric pressure, i.e. this space is subject to a negative pressure. Since the apparatus which contain these boilers are generally provided with valves which prevent the steam from escaping, except when this is required by the operator, it is impossible to draw any compensating air from the external environment. Consequently, if a boiler is provided, in the supply circuit, with a pump self-priming device, as described in the above mentioned utility model, the negative pressure inside the boiler draws water from the hydraulic supply circuit to the point where it completely fills the boiler, resulting in serious malfunctioning of said boiler during subsequent use since, instead of producing dry steam immediately, initially the boiler emits mixtures of water and steam which may be harmful or dangerous.

It is therefore necessary to use a valve which operates so that it not only releases air in order to re-prime the pump, but also allows a gradual intake of air to the boiler to be supplied when the latter is subject to a negative pressure.

The present invention is intended for this purpose and consists of a device which performs the multiple functions of self-priming of the pump, compensation of negative pressure inside the boiler and protection of the latter against overpressure, said device comprising a non-return valve and an air release valve situated upstream of the non-return valve, characterized in that a discharge pipe of the air release valve terminates above the surface of the water contained in a tank for reserve of supply water, in that this valve, in addition to opening completely in order to release the air externally in the event of re-priming of the pump, is also able to admit a flow of air from the outside towards the boiler so as to allow compensation of the negative pressure in said boiler without drawing water from the tank.

In addition, the device according to the invention is characterized in that an externally discharging safety valve is installed downstream of the non-return valve.

Preferably, the safety valve discharges into the same discharge pipe as the air release valve.

In particular, the valve, which opens completely in order to release the air, in the event of re-priming of a pump, and is also able to admit a flow of air from the outside to the boiler, consists of a plug provided at a first end located towards the central axis of the device with a recess which favours the through-flow of air.

More particularly, this recess is formed by a cylindrical cavity coaxial with the plug, directed towards the inside of the device and provided with at least one incision connecting the cavity to the periphery of the plug.

Preferably, the incisions are two in number.

More preferably, the incisions are three in number.

In particular, the safety valve, which is installed downstream of the non-return valve, is formed by a cylindrical seat which is provided with a narrow hole communicating with the said downstream zone and kept closed by a ball pushed by a spring calibrated in accordance with a safety pressure.

The features of the present invention will be defined in particular in the claims forming the conclusive portion of the description.

However, other features and advantages thereof will emerge from the following detailed description of a preferred and non-limiting embodiment thereof, with reference to the enclosed drawings, in which:

FIG. 2 shows a perspective view of a plug present in the valve for releasing air and compensating for the negative pressure of the device according to the invention;

FIG. 3 shows a cross-sectional view along the line 3—3 of FIG. 2; and

Figure 1:
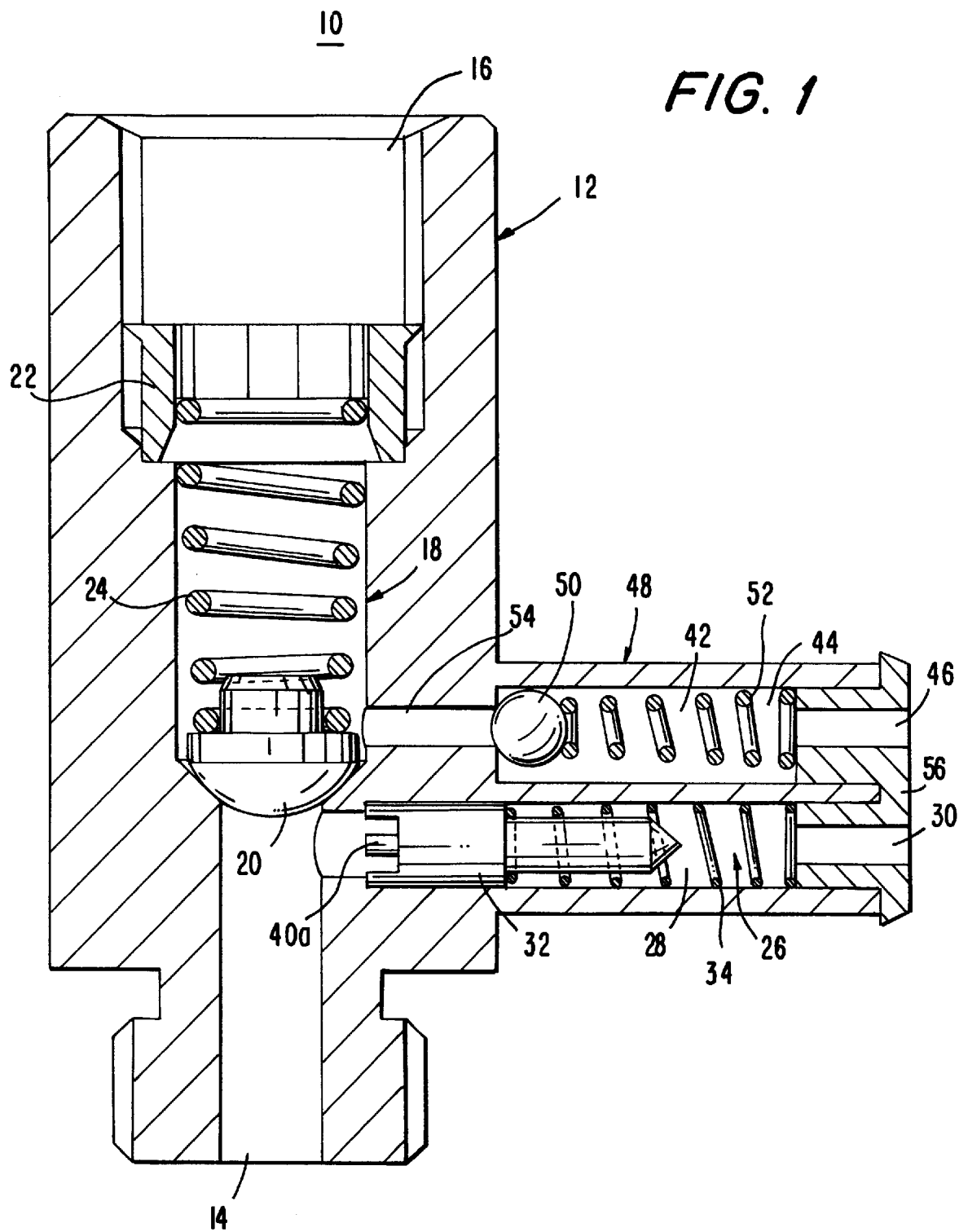
FIG. 1 shows a cross-sectional side view of an embodiment of the invention.
Figure 4:
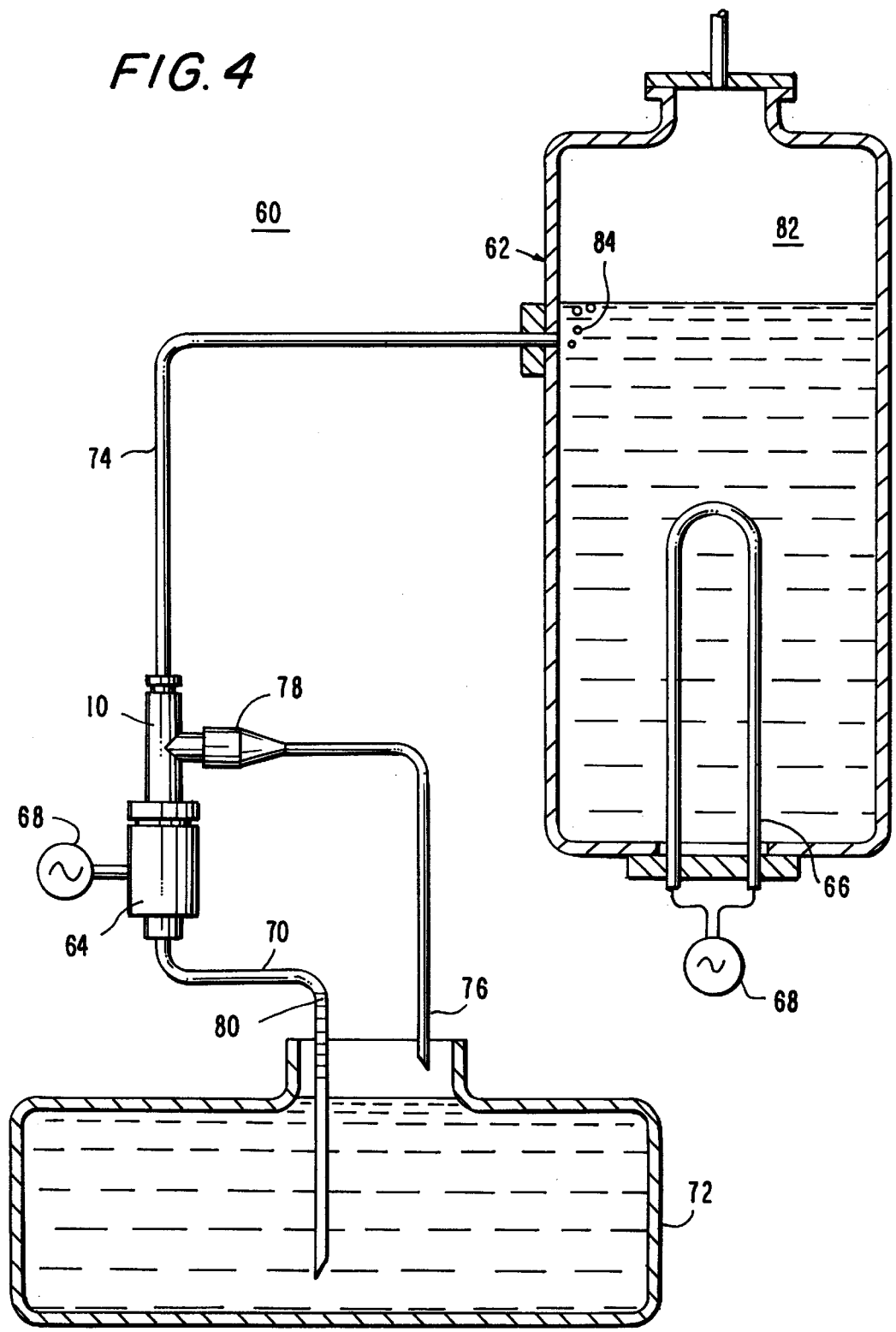
FIG. 4 shows an example of a possible application of the device according to the invention to a large-size boiler for generating steam for domestic use.

With reference to FIGS. 1 to 3, it can be seen that a device 10 according to the present invention consists of a central body 12 which has, formed in it, two cylindrical cavities 14 and 16 which are coaxial, but have different diameters. The cylindrical cavity 14, which has a smaller diameter, is connected directly to the delivery outlet of a pump (shown by way of example in FIG. 4), while the cavity 16, which has a larger diameter, is connected to a delivery pipe, for example leading into a boiler, as shown in FIG. 4. The two cylindrical cavities 14 and 16 are connected together by means of a non-return valve 18. The non-return valve 18 consists of a mushroom-shaped plug 20, the semi-spherical bottom part of which rests against a seat formed in the top end of the cylindrical cavity 14 with a smaller diameter. The bottom part of the cylindrical cavity 16 with a larger diameter has, arranged inside it, a non-return valve stop 22 against the underneath of which a spring 24 of the valve 18 bears, said spring keeping the mushroom-shaped plug 20 pressed against its bearing seat The cylindrical cavity 14 which has a smaller diameter communicates with a valve 26 which is arranged transversely and is formed by two cylindrical cavities 28 and 30 which have different diameters and are connected in series and the larger one 28 of which contains a plug 32 sliding inside it and opposed by a spring 34 which rests against the bottom of the larger cavity 28. The plug 32 terminates at an outer end in a conical tip 36 and at an inner end in a cavity 38 connected externally by three incisions 40a, 40b and 40c. The cylindrical cavity 16 with the larger diameter communicates with a lateral cylindrical cavity 42 composed of two cylindrical cavities 44 and 46 which have different diameters and are connected in series and the larger one 44 of which contains a safety valve 48 formed by a ball 50 which rests pressed by a spring 52 against a hole 54 communicating with the cavity 16. The smaller cylindrical cavity 46 acts as a discharge for the safety valve 48. The two cylindrical cavities 30 and 46 are formed in a single connection-piece 56 which is to be connected to a pipe which is shown in FIG. 4.

Let us now consider FIG. 4 which shows a system 60 comprising a large-size boiler 62 which is supplied with water by a vibration pump 64 having at its outlet the device 10 according to the present invention. The boiler 62 is of the conventional type provided with a resistance heater 66 connected to an electrical supply network 68 by means of one of the usual thermostats which enable the temperature of the water inside the boiler 62 to be kept at a stable value. The pump 64 is also connected to the same electrical supply network 68 by means of a pressure switch or a liquid level indicator, which are also usual. The pump 64 draws via a pipe 70 from a tank 72 containing a reserve water supply for the boiler 62 and conveys water to the boiler 62 by means of a delivery pipe 74. A pipe 76 is also branched from the device 10 and is engaged via a cover 78 with the connection-piece 56 which can be seen in FIG. 1 and receives the outputs from the cavities 30 and 46. The operation of the invention can be easily understood with reference to all the figures.

If the pump 64 is unprimed, activation thereof causes the expulsion, from it, of the air at a pressure sufficient to overcome partially the force of the spring 34 so as to displace the plug 32 away from the bottom of the cavity 28 and allow the air to escape from the cavity 30 to the pipe 76, the discharge outlet of which is situated inside the tank 72 above the surface of the water contained therein. As soon as the pump is primed, the water reaches the cylindrical cavity 14, then passing into the cavity 28 where, on account of its viscosity, it draws the plug 32 with it, causing it to overcome the force of the spring 34 until its conical tip 36 closes the through-hole of the cavity 30 and hence the pressure of the water is able to rise up to the point where it manages to overcome the force on the plug 20 of the non-return valve 18, due in particular to the pressure inside the boiler, as well as to the spring 24, causing the water to pass to the boiler 62. This function is exactly the same as that performed by the invention of the prior art described in the above mentioned Industrial Utility Model No. 0,215,741. If the boiler cools to the point where it produces a negative pressure in its upper zone 82, this negative pressure tends to draw water from the tank 72, which water stops at a level 80 which is controlled by the possibility of entry of the air from the pipe 76, which passes around the plug 32, favoured by the presence of the cavity 38 and the incisions 40a–40c. The air continues to enter into the boiler 62, as indicated by the bubbles 84, accumulating in the zone 82 until the negative pressure is entirely compensated for. At this point the pressure inside the boiler 62 is completely in balance with the atmospheric pressure.

A need for water inside the boiler 62 is satisfied by the pump 64 which closes the vent and compensation valve 26, allowing opening of the non-return valve 18 and the flow of water into the boiler 62.

The invention expects the use of the safety valve 48 which is installed close to the breather valve 26 and connected to the tank 72 by means of the discharge pipe 76 for two reasons:

firstly, for a cost-related and space-saving reason, because it allows the safety valve 48 to be incorporated in the same device 10 without having to install a safety valve at another point, which would involved extra work and space;

secondly, because any steam which is released due to operation of safety valve is cooled in the mass of water inside the tank 72, resulting in a reduction in its temperature and the associated dangers.

The above constitutes merely a detailed description of a preferred embodiment of the present invention and equivalent solutions and variations may occur to any person skilled in the art, from a reading of said description, said solutions or variations also being covered by the scope of the claims which follow.

For example, the number of incisions 40a–c around the cavity 38 may be less than or greater than that shown in FIGS. 2 and 3. The safety valve 42 could have a discharge pipe separate from the pipe 76 which also serves the release and compensation valve 26. Furthermore, obviously the safety valve 42, instead of comprising a ball 50 seated in the cavity 44, may also comprise a known other closing element, different from a ball, which is seated in a corresponding cavity. Finally, it is possible to use, instead of the reserve water tank 72, a connection to a water supply mains, in which case the pump 64 could also be dispensed with and the pipe 76 could lead into a simple venting chamber connected to the external atmosphere.

What is claimed is:

1. A device for use in a system for pumping water through a conduit from a water supply to a boiler, said device being arranged in said conduit between said water supply and said boiler and comprising:

a central body member having a major central axis and containing the elements of said device, said body member having a first end to be coupled to said boiler and a second end to be coupled to said water supply;

a non-return valve mounted in said first end of said body member substantially along said central axis thereof;

a safety valve mounted in said body member downstream of said non-return valve to release any overpressure in said boiler; and an air-release valve mounted in said body member upstream of said non-return valve, said air release valve having means for releasing air trapped between said water supply and said central body member and means for admitting air into said central body member when a negative pressure is formed in said boiler.

2. A device as in claim 1, wherein the air release opens completely in order to release the air and comprises a plug having an axis and a recess which favors the through-flow of air.

3. A device as in claim 2, wherein the recess is formed by a cylindrical cavity coaxial with the plug, directed towards the inside of said central body member and provided with at least one incision connecting the cavity to the periphery of the plug.

4. A device as in claim 3, wherein the incisions are three in number.

5. A device as in claim 1, wherein the safety valve is formed by a cylindrical seat which is provided with a narrow hole communicating with said central body member and a ball which closes said safety valve under pressure from a spring calibrated in accordance with a safety pressure.

6. A device as claimed in claim 1 wherein said water supply is a supply tank.

7. A device according to claim 6 wherein a vibration pump is arranged between said central body member and said supply tank and said release of air from said air-release valve self-primes the pump.

8. A device as claimed in claim 6 wherein said air-release valve discharges into a discharge pipe terminating in said supply tank, above the surface of water contained therein.

9. A device as in claim 8, wherein the safety valve discharges into the same discharge pipe as the air release valve.

10. A device as claimed in claim 1 wherein said air-release valve also includes means for closing said air-release valve when water is being supplied to said boiler through said central body member.

11. A device as claimed in claim 1 wherein said air-release valve has a first cylindrical cavity with a first end facing said central axis and a second end remote from said axis, said valve including a plug mounted in said first cavity and having a conical tip facing away from the central axis of said body member and a recess facing towards said central axis, said recess including spaced areas to allow air to flow from the central axis of said body member towards the outside of said body member and vice versa.

12. A device as claimed in claim 11 wherein the recess of said plug is a second cylindrical cavity having at least one incision connecting said second cavity with the outside of said plug.

13. A device as claimed in claim 11 wherein said first cavity terminates at its remote end in an opening having a diameter which can be closed by said conical tip of said plug when said plug is urged towards said remote end.

* * * * *